(12) United States Patent
Mukkavilli et al.

(10) Patent No.: US 8,144,818 B2
(45) Date of Patent: Mar. 27, 2012

(54) APPARATUS AND METHODS FOR DETERMINING TIMING IN A COMMUNICATION SYSTEM

(75) Inventors: Krishna Kiran Mukkavilli, San Diego, CA (US); Michael Mao Wang, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 11/303,487

(22) Filed: Dec. 15, 2005

(65) Prior Publication Data

US 2007/0140385 A1 Jun. 21, 2007

(51) Int. Cl.
*H03D 1/00* (2006.01)
(52) U.S. Cl. ........ 375/343; 375/260; 375/316; 375/342; 375/346; 375/350; 370/208; 370/345; 370/504
(58) Field of Classification Search .................. 375/150, 375/152, 260, 267, 340, 343, 355, 135–137, 375/146, 147, 219, 243, 259, 295, 316, 342, 375/354, 359, 364, 254, 292, 95, 371, 262, 375/322

See application file for complete search history.

(56) References Cited

U.S. PATENT DOCUMENTS

| 5,852,630 | A * | 12/1998 | Langberg et al. ............. 375/219 |
| 6,459,744 | B1 | 10/2002 | Helard et al. |
| 7,065,144 | B2 | 6/2006 | Walton et al. |
| 7,139,338 | B2 * | 11/2006 | Wilson et al. .................. 375/343 |
| 7,480,234 | B1 * | 1/2009 | Hart et al. ...................... 370/208 |
| 7,864,880 | B2 * | 1/2011 | Giannakis et al. ............ 375/295 |
| 7,949,061 | B2 * | 5/2011 | Tong et al. ..................... 375/260 |
| 2003/0016773 | A1 * | 1/2003 | Atungsiri et al. ............. 375/355 |
| 2005/0047515 | A1 * | 3/2005 | Walton et al. .................. 375/267 |
| 2006/0215778 | A1 * | 9/2006 | Murthy et al. ................. 375/260 |
| 2006/0233097 | A1 * | 10/2006 | Vrcelj et al. ................... 370/208 |
| 2007/0025457 | A1 * | 2/2007 | Wang ............................. 375/260 |

(Continued)

FOREIGN PATENT DOCUMENTS

EP 1014636 6/2000

(Continued)

OTHER PUBLICATIONS

International Search report—PCT/US06/062195, International Search Authority—European Patent Office—Nov. 30, 2007.

(Continued)

*Primary Examiner* — Hirdepal Singh
(74) *Attorney, Agent, or Firm* — Ryan N. Farr (57) ABSTRACT

Apparatus and methods for use in a wireless communication system are disclosed for determining a timing position for channel activity in order to resolve timing ambiguity. A disclosed apparatus includes a processor that determines when channel activity occurs in at least one of an early or a late arrival position in a communication channel estimate and unwraps the channel activity in either the early arrival position or the late arrival position to a corresponding late or early arrival unwrapped channel activity position in the wireless channel estimate. The processor correlates symbol data in the communication signal corresponding to both the channel activity and the unwrapped channel activity to symbol data of the main channel activity. The processor determines whether a correct timing position of the channel activity is one of the early or late arrival positions based on the correlations, thus resolving timing ambiguity. Complementary methods are also disclosed.

49 Claims, 5 Drawing Sheets

U.S. PATENT DOCUMENTS

| | | | |
|---|---|---|---|
| 2007/0058758 A1* | 3/2007 | Ishii | 375/343 |
| 2007/0110174 A1* | 5/2007 | Glazko et al. | 375/260 |
| 2007/0174891 A1* | 7/2007 | Gouhara | 725/131 |

FOREIGN PATENT DOCUMENTS

| | | |
|---|---|---|
| EP | 1478150 | 11/2004 |
| EP | 1584151 A1 | 10/2005 |
| TW | I227408 | 2/2005 |
| TW | I230523 | 4/2005 |
| TW | I231119 | 4/2005 |
| TW | I232649 | 5/2005 |
| TW | I232651 | 5/2005 |
| TW | I234954 | 6/2005 |

OTHER PUBLICATIONS

International Preliminary Report—PCT/US2006/062195, International Search Authority—The International Bureau of WIPO—Geneva, Switzerland—Jun. 18, 2008.

Written Opinion—PCT/US2006/062195, International Search Authority—European Patent Office—Jun. 9, 2008.

\* cited by examiner

APPARATUS AND METHODS FOR DETERMINING TIMING IN A COMMUNICATION SYSTEM

BACKGROUND

1. Field

The present disclosure relates generally determining timing in a wireless communication system and, more specifically to apparatus and methods for determining timing in order to resolve timing ambiguity in a transceiver of a wireless communication system, which thereby effectively extends the timing tracking dynamic range.

2. Background

In certain wireless communication systems, such as a system employing orthogonal frequency division multiplexing (OFDM) as an example, timing tracking of transmitted signal is performed based on channel estimation. A signal channel is commonly estimated using pilot signals, which are transmitted as part of the total signal. The length of channel estimation is limited by the number of pilot channels transmitted, which is limited by the overhead cost resulting from pilot channel transmission. In one example of an OFDM system, a maximum number of two FDM pilot channels are used to limit the overhead due to transmission of the pilot channels. In such an example, the maximum length of channel estimation for timing tracking would be limited to an "L" number of samples, where L=1024 samples or chips. Assuming in such a system that the actual maximum channel length is 768 samples or chips, the dynamic range left for timing tracking is very limited (i.e., 256 samples or chips). Accordingly, in such applications as this where the channel estimation is not sufficiently longer than the actual channel length (i.e., 1024 is not much greater than 768), currently known timing tracking becomes problematic since the dynamic range of timing is limited (i.e., ±128 samples or chips).

Furthermore, due to the periodicity (i.e., the characteristic or quality of occurring at regular intervals) of channel estimation, further ambiguity in the timing tacking may result. Because of periodic nature of channel estimation, early appearing signal symbol energy of a specific channel resulting from multipath transmission of the signal will actually appear "late" in the channel estimate because of "wrap around." Similarly, late appearing signal symbol energy will actually appear as early in the channel estimate. Thus, timing ambiguity can result since early or late appearing symbol energy in the channel estimate may actually be the converse.

SUMMARY

According to an aspect of the present disclosure, a method for determining a timing position in a communication channel estimation includes detecting when channel activity in the communication channel occurs in at least one of an early or a late arrival position in a communication channel estimate. The method further includes unwrapping the detected channel activity in either the early arrival position or the late arrival position to a corresponding late or early arrival unwrapped channel activity position in the wireless channel estimate and then correlating symbol data in the communication signal corresponding to both the channel activity and the unwrapped channel activity positions to symbol data corresponding to a main channel activity. Finally, the method includes determining whether a correct timing position of the channel activity is one of the early or late arrival positions based on the correlations.

According to another aspect, a wireless transceiver is disclosed and includes a timing estimation circuit configured to detect when channel activity in a communication channel occurs in at least one of an early or a late arrival position in a communication channel estimate. The estimation circuit is also configured to unwrap the detected channel activity in either the early arrival position or the late arrival position to a corresponding late or early arrival unwrapped channel activity position in the wireless channel estimate and to correlate symbol data in the communication signal corresponding to both the channel activity and the unwrapped channel activity positions to symbol data corresponding to a main channel activity. Further, the estimation circuit is configured to determine whether a correct timing position of the channel activity is one of the early or late arrival positions based on the correlations.

According to yet another aspect, a method for determining a timing position in a communication signal includes determining when channel activity of the communication signal occurs in at least one of an early or a late arrival position in a communication channel estimate; unwrapping the channel activity in either the early arrival position or the late arrival position to a corresponding late or early arrival unwrapped channel activity position in the wireless channel estimate; determining symbol data in the communication signal corresponding to both the channel activity and the unwrapped channel activity; correlating the determined symbol data corresponding to both the channel activity and the unwrapped channel activity to symbol data corresponding to channel activity occurring in another portion of the channel estimate location including a maximum channel activity; and determining whether a timing position of the channel activity occurs in one of the early or late arrival positions based on the correlations of the symbol data corresponding to both the channel activity and the unwrapped channel activity to symbol data corresponding to the maximum channel activity.

According to still another aspect, a method for determining a timing position for channel activity of communication signal received in a communication device is disclosed and includes detecting channel activity in one of a late or early buffer zone of a channel estimate; attributing the detected channel activity to one of an early or late channel estimate position that is opposite the location of the detected channel activity; determining a corresponding detected data sample in a symbol data sequence that corresponds to the detected channel activity in a location of the symbol data sequence corresponding the detected channel activity location; determining a corresponding attributed data sample in the symbol data sequence that corresponds to the attributed channel activity in a location of the symbol data sequence corresponding the detected channel activity location; determining a corresponding maximum channel data sample in the symbol data sequence that corresponds to a maximum channel activity in a location of the symbol data sequence corresponding the maximum channel activity in the channel estimate; performing a first correlation between the corresponding detected data sample and the corresponding maximum channel data sample; performing a second correlation between the corresponding attributed data sample and the corresponding maximum channel data sample; and determining a correct timing position for the detected channel activity based on a determination of which of the first and second correlations is greater.

According to a further aspect, a machine-readable storage medium is disclosed including a set of instructions. The stored instructions include instructions for determining when channel activity occurs in at least one of an early or a late arrival position in a communication channel estimate;

unwrapping the channel activity in either the early arrival position or the late arrival position to a corresponding late or early arrival unwrapped channel activity position in the wireless channel estimate; determining symbol data in the communication signal corresponding to both the channel activity and the unwrapped channel activity; correlating the determined symbol data corresponding to both the channel activity and the unwrapped channel activity to symbol data corresponding channel activity occurring in another portion of the channel estimate location including a maximum channel activity; and determining whether a timing position of the channel activity occurs in one of the early or late arrival positions based on the correlations of the symbol data corresponding to both the channel activity and the unwrapped channel activity to symbol data corresponding to the maximum channel activity.

According to yet a further aspect, a machine-readable storage medium is disclosed including a set of instructions. The stored instructions include instructions for detecting channel activity in one of a late or early buffer zone of a channel estimate; attributing the detected channel activity to one of an early or late channel estimate position that is opposite the location of the detected channel activity; determining a corresponding detected data sample in a symbol data sequence that corresponds to the detected channel activity in a location of the symbol data sequence corresponding the detected channel activity location; determining a corresponding attributed data sample in the symbol data sequence that corresponds to the attributed channel activity in a location of the symbol data sequence corresponding the detected channel activity location; determining a corresponding maximum channel data sample in the symbol data sequence that corresponds to a maximum channel activity in a location of the symbol data sequence corresponding the maximum channel activity in the channel estimate; performing a first correlation between the corresponding detected data sample and the corresponding maximum channel data sample; performing a second correlation between the corresponding attributed data sample and the corresponding maximum channel data sample; and determining a correct timing position for the detected channel activity based on a determination of which of the first and second correlations is greater.

According to another aspect, a transceiver for use in a wireless communication system is disclosed having a processor configured to determine when channel activity occurs in at least one of an early or a late arrival position in a communication channel estimate. The processor also is configured to unwrap the channel activity in either the early arrival position or the late arrival position to a corresponding late or early arrival unwrapped channel activity position in the wireless channel estimate; determine symbol data in the communication signal corresponding to both the channel activity and the unwrapped channel activity; correlate the determined symbol data corresponding to both the channel activity and the unwrapped channel activity to symbol data corresponding channel activity occurring in another portion of the channel estimate location including a maximum channel activity; and determine whether a timing position of the channel activity occurs in one of the early or late arrival positions based on the correlations of the symbol data corresponding to both the channel activity and the unwrapped channel activity to symbol data corresponding to the maximum channel activity.

According to a further aspect, a transceiver is disclosed for use in a wireless communication system and includes a processor configured to detect channel activity in one of a late or early buffer zone of a channel estimate. The processor is further configured to attribute the detected channel activity to one of an early or late channel estimate position that is opposite the location of the detected channel activity; determine a corresponding detected data sample in a symbol data sequence that corresponds to the detected channel activity in a location of the symbol data sequence corresponding the detected channel activity location; determine a corresponding attributed data sample in the symbol data sequence that corresponds to the attributed channel activity in a location of the symbol data sequence corresponding the detected channel activity location; determine a corresponding maximum channel data sample in the symbol data sequence that corresponds to a maximum channel activity in a location of the symbol data sequence corresponding to the maximum channel activity in the channel estimate; perform a first correlation between the corresponding detected data sample and the corresponding maximum channel data sample; perform a second correlation between the corresponding attributed data sample and the corresponding maximum channel data sample; and determine a correct timing position for the detected channel activity based on a determination of which of the first and second correlations is greater.

According to still another aspect, an apparatus for resolving timing in a wireless communication device is disclosed and includes: means for determining when channel activity occurs in an early or a late arrival position of a channel estimate; means for unwrapping channel activity in either the early arrival position or the late arrival position to a corresponding late or early arrival position of channel activity in the channel estimate; means for determining symbol data in signal data that corresponds to both the channel activity and the unwrapped channel activity; means for correlating the determined symbol data corresponding to both the channel activity and the unwrapped channel activity to symbol data corresponding to a maximum channel activity occurring in the channel estimate; and means for determining a correct timing position of the channel activity occurring in either the early or late arrival position based on the correlations of the symbol data corresponding to both the channel activity and the unwrapped channel activity to symbol data corresponding to the maximum channel activity.

According to another aspect, a method for determining a timing position in a communication signal is disclosed, including determining a first channel activity of the communication signal occurring in an early arrival position in a communication channel estimate and unwrapping the first channel activity in a late arrival position in the communication channel estimate. The method further includes determining symbol data in the communication signal corresponding to both the first channel activity and the unwrapped first channel activity, and correlating the determined symbol data corresponding to both the first channel activity and the unwrapped first channel activity to symbol data corresponding to a second channel activity occurring in another portion of the channel estimate including a main channel activity. Finally, the method includes determining a timing position of the first channel activity based on the correlation of the determined symbol data corresponding to both the first channel activity and the unwrapped first channel activity to symbol data corresponding to the second channel activity.

According to yet another aspect, a method for determining a timing position in a communication signal is disclosed and includes determining a first channel activity of the communication signal occurring in a late arrival position in a communication channel estimate. The method further includes unwrapping the first channel activity in an early arrival position in the communication channel estimate, determining symbol data in the communication signal corresponding to both the first channel activity and the unwrapped first channel activity, and correlating the determined symbol data corresponding to both the first channel activity and the unwrapped first channel activity to symbol data corresponding to a second channel activity occurring in another portion of the channel estimate including a main channel activity. Finally, the method includes determining a timing position of the first channel activity based on the correlation of the determined symbol data corresponding to both the first channel activity and the unwrapped first channel activity to symbol data corresponding to the second channel activity.

According to still another aspect, a method for determining a timing position in a communication channel estimation is disclosed that includes detecting first channel activity occurring in an early arrival position in a communication channel estimate, unwrapping the detected first channel activity in a late arrival position in the wireless channel estimate, correlating symbol data in the communication signal corresponding to both the first channel activity and the unwrapped first channel activity positions to symbol data corresponding to a main channel activity, and determining a timing position of the first channel activity based on the correlations.

According to one other aspect, a method for determining a timing position in a communication channel estimation is disclosed that includes detecting first channel activity occurring in a late arrival position in a communication channel estimate. The method further includes unwrapping the detected first channel activity in an early arrival position in the wireless channel estimate, correlating symbol data in the communication signal corresponding to both the first channel activity and the unwrapped first channel activity positions to symbol data corresponding to a main channel activity, and determining a timing position of the first channel activity based on the correlations.

DETAILED DESCRIPTION

The present disclosure relates generally to resolving timing tracking ambiguity in a wireless communication system and, more specifically to apparatus and methods for resolving timing ambiguity in a transceiver of a wireless communication system thereby effectively extending the timing tracking dynamic range.

Figure 1:
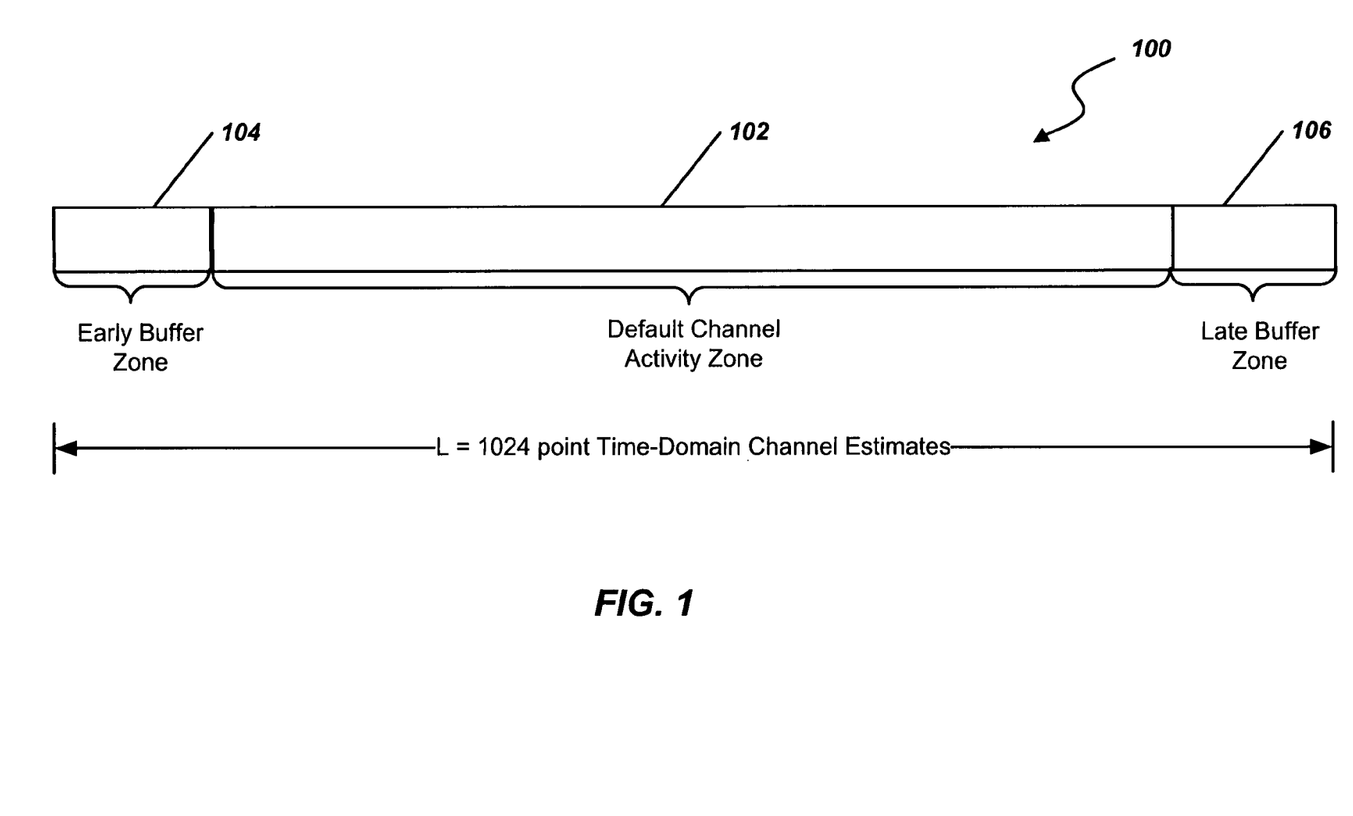
FIG. 1 is an illustration of channel estimate zones of an exemplary wireless communication system.

To aid in the description of the disclosed apparatus and methods, FIG. 1 provides an illustration of channel estimate zones of an exemplary wireless communication system. As shown, an exemplary channel estimate 100 is divided into two types of zones. The first zone type 102 is a default channel activity zone in which the maximum or largest symbol path is assumed, as a default, to most likely occur. Given the example OFDM system discussed above, the total time domain of the channel estimate would be 1024 chips, with the default channel activity zone 102 consisting of 768 chips, as an example. Examples of the second zone type are early and later buffer zones 104 and 106, respectively (also commonly known as guard intervals in OFDM systems). Again assuming the exemplary OFDM system discussed in the background, the early and late buffer zones 104, 106 would each have a length of 128 chips.

In general, any new paths that appear in the early buffer zone 104 due to new submerging paths and/or sleep timing error, as examples, are considered first arrival position (FAP). Similarly, any new paths that appear in the late buffer zone 106 are considered as late arrival position (LAP). Assuming the example in the background, the dynamic range of the timing tracking would be ±128 chips. Due to the periodicity characteristic of the channel estimation, any first arrival position (FAP) activity appearing earlier than the first 128 chips (i.e., the early buffer zone 104) is "wrapped" into the late buffer zone 106 and treated as late arrival position (LAP). Similarly, any LAP appearing after the 128 chips of the late buffer zone 106 is wrapped into the early buffer zone 104 and is treated as FAP. In either case, the resulting channel estimate suffers from degradation because of the ambiguity of whether activity appearing as LAP or FAP is actually what it appears to be or is, instead LAP or FAP that has been "wrapped" into the opposite buffer zone. This degradation results in timing error and degraded demodulation performance of a transceiver depending on the strength of the new paths.

The present disclosure provides apparatus and methods that may be used to resolve the ambiguity of the apparent FAP and LAP, and thereby effectively extend the dynamic range of the timing tracking process. In short, the disclosed apparatus and method utilize symbol data samples to resolve the timing ambiguity due to the limited resolution provided by channel estimate, such as in OFDM systems, for example. That is, whenever there is a possibility of wrapping around in the channel estimation, the symbol data is used to resolve the ambiguity.

According to the presently disclosed exemplary apparatus and methods, the early and late buffer zones 104, 106 can be divided into several bins. However, for simplicity of discussion, the disclosed example is assumed to utilize only one bin. When channel activities are determined to have occurred in either of the two buffer zones 104, 106, a binary or two-part test is then performed.

In the following discussion concerning the test, it is assumed that channel activities are detected in the late buffer zone. It is noted, however, that one skilled in the art will recognize that this is only an example and that the test is also applicable for channel activities detected in the early buffer zone.

Figure 2:
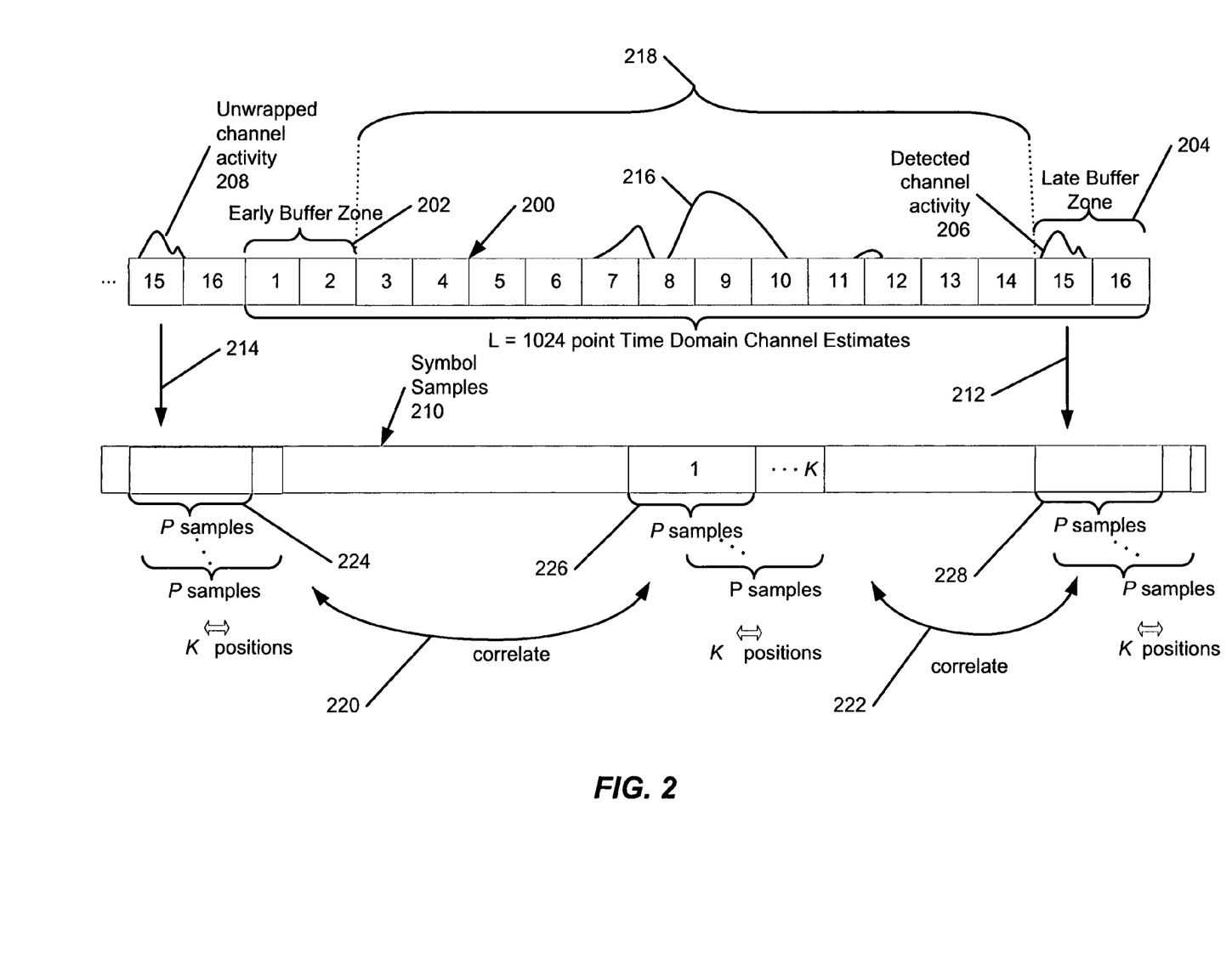
FIG. 2 is an illustration of an exemplary method for determining correspondence between symbols in a channel estimate and actual symbol data and correlating symbol data between corresponding signal symbols in the actual symbol data.

Prior to the first part of a test to determine whether channel activity detected in a late buffer zone is correctly late occurring activity (e.g., LAP), the LAP is "unwrapped,' i.e., the activity is also placed as first arrival position (FAP) and placed according to the relationship $i_{FAP}=-(L-i_{LAP})$, which means that the activity is accorded or attributed a placement prior to the early buffer zone. As an illustration, FIG. 2 shows a channel estimate 200 for the current example, where the estimate is divided into 16 bins of 64 samples each assuming a channel length of 1024 samples. The first two bins (e.g., 1 and 2) comprise the early buffer zone 202 and the last two bins (e.g., 15 and 16) comprise the late buffer zone 204. The detected late occurring channel activity 206 (LAP) is then unwrapped and attributed placement according to the relationship above, thus placing the channel activity prior to the early buffer zone 202, as illustrated by unwrapped channel activity 208 (also referred to hereinafter as FAP 208). Stated another way, the unwrapped channel activity is attributed a location opposite to the location of the detected channel activity, e.g., LAP is attributed FAP location. It is noted that the bins illustrated in FIG. 2 are only to assist in illustrating the presently disclosed methods and apparatus and lesser or greater numbers of bins could be used, or no bins at all.

Also prior to testing whether channel activity detected in a late buffer zone is correctly late occurring activity, correspondence between the channel activity in the channel estimate 200 and the symbol data occurring in the actual symbol data is determined. This data is illustrated in FIG. 2 by actual symbol data 210, which is the sequentially received symbol data. As also shown in FIG. 2, the late occurring channel activity 206 is matched to corresponding data symbols in the actual symbol data 210 as illustrated with arrow 212. Likewise the unwrapped channel activity 208 is matched to corresponding data symbols in the actual symbol data 210 as illustrated with arrow 214. In resolving the channel timing ambiguity, the largest path activity 216 occurring within a default channel activity zone 218 of the channel estimate 200 is matched to corresponding data within the actual symbol data 210.

Accordingly, in one of the two parts of the test the data in the actual symbol data 210 that corresponds with the channel activity FAP 208 is compared or correlated with the data in the actual symbol data corresponding with the largest known path activity 216 to determine how closely they are alike. This is shown diagrammatically in FIG. 2 by arrow 220. The greater the correlation is indicative that the FAP channel activity likely exists at the position of first arriving channel activity 208.

In the other part of the two part test, the data in the actual symbol data 210 that corresponds with the channel activity LAP 206 is similarly compared or correlated with the data in the actual symbol data corresponding with the largest known path activity 216 to determine how closely they are alike. This is shown diagrammatically in FIG. 2 by arrow 222. The greater the correlation is indicative that the LAP channel activity likely exists at the position of late arriving channel activity 206. Thus, the correlation that matches the most closely indicates the strongly likelihood that that particular channel activity is the correct location i.

According to a further example illustrated in FIG. 2, a predetermined P number of samples of the actual symbol data is used for determining each of the correlations. The number P may be set to any number desired, but should be of a sufficient number to ensure an accurate correlation estimation. Normally, the larger the number of samples used for correlation estimation, the more accurate the estimate is, however, the higher complexity for calculating the correlation. During the two part test a P number of samples of the actual data 224 corresponding to the FAP channel activity is thus correlated with a P number of samples of actual data 226 corresponding to the largest path activity 216. Likewise, a P number of samples of the actual data 228 corresponding to the LAP channel activity is correlated with the P number of samples of actual data 226 corresponding to the largest path activity 216.

In yet a further example in FIG. 2, multiple correlations are performed, with one correlation performed at each of a K number of neighboring positions. By performing multiple correlations at different neighboring positions, each using a P number of samples, the accuracy of resolving timing ambiguity is increased. Thus, after the K number of correlations is performed for K number of neighboring positions, a statistical determination may be made as to which of the LAP or unwrapped FAP is more likely is the correct position for the channel activity, given the example of FIG. 2. This multiple correlations is illustrated in FIG. 2 by two P sample ranges shown for each of the FAP, LAP and largest path activity and ellipses between the shown pair of sample ranges to indicate that K could be greater than a value of two (2).

According to an example in an OFDM system, one part of the two-part test may include determining a correlation coefficient $r_{FAP}$, which is a quantitative measure of the correlation of FAP to the largest path activity at $i_{max}$ in the channel activity zone. This coefficient $r_{FAP}$ can be expressed according to following relationship:

$$r_{FAP} = \sum_{i=0}^{P-1} y(i + i_{FAP}) y^*(i + i_{max}) \qquad (1)$$

$$= \sum_{i=0}^{P-1} \left[ \alpha_{FAP} s_n(i) + \alpha_{max} s_{n-1}(i + N - i_{max} + i_{FAP}) + \sum_{k \neq i_{max}} \alpha_k s_{n-1}(i + N - i_k + i_{FAP}) + w(i + i_{FAP}) \right] \cdot$$

$$\left[ \alpha_{FAP} s_n(i + i_{max} - i_{FAP}) + \alpha_{max} s_n(i) + \sum_{\{i_k > i_{max}\}} \alpha_k s_{n-1}(i + i_k - i_{max}) + \sum_{\{i_k < i_{max}\}} \alpha_k s_n(i + i_{max} - i_k) + w(i + i_{max}) \right]^*$$

where y represents the OFDM symbol data samples, $s_n$ is an nth OFDM symbol, $\alpha_k$ is the kth path's channel gain, N is the number of (independent) samples in an OFDM symbol, w(i) is the ith noise sample, $\alpha_{max}$, is the maximum path's channel gain, $i_{FAP}$ is the position of the unwrapped FAP, i is the position of the LAP, and $i_k$ is the kth path's position. Additionally, the * indicates taking a conjugate of a given value.

Expanding equation (1) above, yields the following equation (2):

$$r_{FAP} = \alpha_{FAP} \alpha_{max}^* \sum_{i=0}^{P-1} \|s_n(i)\|^2 + \qquad (2)$$

$$\sum_{i=0}^{P} \left[ \alpha_{FAP} \alpha_{FAP}^* s_n(i) s_n^*(i + i_{max} - i_{FAP}) + \alpha_{FAP} s_n(i) w^*(i + i_{max}) + \right.$$

$$\alpha_{max} \alpha_{FAP}^* s_{n-1}(i + N - i_{max} + i_{FAP}) s_n^*(i + i_{max} - i_{FAP}) +$$

$$\alpha_{max} \alpha_{max}^* s_{n-1}(i + N - i_{max} + i_{FAP}) s_n^*(i) +$$

$$\alpha_{max} s_{n-1}(i + N - i_{max} + i_{FAP}) w^*(i + i_{max}) +$$

$$\alpha_{FAP}^* w(i + i_{FAP}) s_n^*(i + i_{max} - i_{FAP}) + \alpha_{max}^* w(i + i_{FAP}) s_n^*(i) +$$

$$w(i + i_{FAP}) w^*(i + i_{max}) + \alpha_{FAP} s_n(i) \sum_{\{i_k > i_{max}\}} \alpha_k^* s_{n-1}^*(i + i_k - i_{max}) +$$

$$\alpha_{FAP} s_n(i) \sum_{\{i_k < i_{max}\}} \alpha_k^* s_n^*(i + i_{max} - i_k) +$$

-continued $$\alpha_{max}s_{n-1}(i+N-i_{max}+i_{FAP})\sum_{\{i_k>i_{max}\}}\alpha_k^*s_{n-1}^*(i+i_k-i_{max})+$$

$$\alpha_{max}s_{n-1}(i+N-i_{max}+i_{FAP})\sum_{\{i_k<i_{max}\}}\alpha_k^*s_n^*(i+i_{max}-i_k)+$$

$$\sum_{k\neq i_{max}}\alpha_k s_{n-1}(i+N-i_k+i_{FAP})\sum_{\{i_k>i_{max}\}}\alpha_k^*s_{n-1}^*(i+i_k-i_{max})+$$

$$\sum_{k\neq i_{max}}\alpha_k s_{n-1}(i+N-i_k+i_{FAP})\sum_{\{i_k<i_{max}\}}\alpha_k^*s_n^*(i+i_{max}-i_k)+$$

$$w(i+i_{FAP})\sum_{\{i_k>i_{max}\}}\alpha_k^*s_{n-1}^*(i+i_k-i_{max})+$$

$$w(i+i_{FAP})\sum_{\{i_k<i_{max}\}}\alpha_k^*s_n^*(i+i_{max}-i_k)+$$

$$\alpha_{FAP}^*s_n^*(i+i_{max}-i_{FAP})\sum_{k\neq i_{max}}\alpha_k s_{n-1}(i+N-i_k+i_{FAP})+$$

$$\alpha_{max}^*s_n^*(i)\sum_{k\neq i_{max}}\alpha_k s_{n-1}(i+N-i_k+i_{FAP})+$$

$$w^*(i+i_{max})\sum_{k\neq i_{max}}\alpha_k s_{n-1}(i+N-i_k+i_{FAP})]$$

Next, by removing the channel phases from equation (2) above, a resultant correlation coefficient $r'_{FAP}$ may be determined as follows:

$$r'_{FAP} = c^*(i_{FAP}\text{mod}L)c(i_{max})r_{FAP} \quad (3)$$

$$= (\alpha_{LAP}^* + u^*(i_{LAP}))(\alpha_{max} + u(i_{max}))r_{FAP}$$

$$= \|\alpha_{FAP}\|^2\|\alpha_{max}\|^2\sum_{i=0}^{P-1}\|s_n(i)\|^2 + (\alpha_{FAP}\|\alpha_{max}\|^2 u^*(i_{LAP})+$$

$$\|\alpha_{FAP}\|^2\alpha_{max}^*u(i_{max}) + \alpha_{FAP}\alpha_{max}^*u^*(i_{LAP})u(i_{max}))\sum_{i=0}^{P-1}\|s_n(i)\|^2 +$$

$$(\alpha_{FAP}^* + u^*(i_{LAP}))(\alpha_{max} + u(i_{max}))\sum_{i=0}^{P}[\alpha_{FAP}\alpha_{FAP}^*s_n(i)$$

$$s_n^*(i+i_{max}-i_{FAP}) + \alpha_{FAP}s_n(i)w^*(i+i_{FAP})+$$

$$\alpha_{max}\alpha_{FAP}^*s_{n-1}(i+N-i_{max}+i_{FAP})s_n^*(i+i_{max}-i_{FAP})+$$

$$\alpha_{max}\alpha_{max}^*s_{n-1}(i+N-i_{max}+i_{FAP})s_n^*(i)+$$

$$\alpha_{max}s_{n-1}(i+N-i_{max}+i_{FAP})w^*(i+i_{max})+$$

$$\alpha_{FAP}^*w(i+i_{FAP})s_n^*(i+i_{max}-i_{FAP}) + \alpha_{max}^*w(i+i_{FAP})s_n^*(i)+$$

$$w(i+i_{FAP})w^*(i+i_{max}) + \alpha_{FAP}s_n(i)$$

$$\sum_{\{i_k>i_{max}\}}\alpha_k^*s_{n-1}^*(i+i_k-i_{max}) + \alpha_{FAP}s_n(i)$$

$$\sum_{\{i_k<i_{max}\}}\alpha_k^*s_n^*(i+i_{max}-i_k) + \alpha_{max}s_{n-1}(i+N-i_{max}+i_{FAP})$$

$$\sum_{\{i_k>i_{max}\}}\alpha_k^*s_{n-1}^*(i+i_k-i_{max}) + \alpha_{max}s_{n-1}(i+N-i_{max}+i_{FAP})$$

$$\sum_{\{i_k<i_{max}\}}\alpha_k^*s_n^*(i+i_{max}-i_k) + \sum_{k\neq i_{max}}\alpha_k s_{n-1}(i+N-i_k+i_{FAP})$$

$$\sum_{\{i_k>i_{max}\}}\alpha_k^*s_{n-1}^*(i+i_k-i_{max}) + \sum_{k\neq i_{max}}\alpha_k s_{n-1}(i+N-i_k+i_{FAP})$$

$$\sum_{\{i_k<i_{max}\}}\alpha_k^*s_n^*(i+i_{max}-i_k) + w(i+i_{FAP})$$

$$\sum_{\{i_k>i_{max}\}}\alpha_k^*s_{n-1}^*4(i+i_k-i_{max}) + w(i+i_{FAP})$$

$$\sum_{\{i_k<i_{max}\}}\alpha_k^*s_n^*(i+i_{max}-i_k) + \alpha_{FAP}^*s_n^*(i+i_{max}-i_{FAP})$$

$$\sum_{k\neq i_{max}}\alpha_k s_{n-1}(i+N-i_k+i_{FAP}) + \alpha_{max}^*s_n^*(i)$$

$$\sum_{k\neq i_{max}}\alpha_k s_{n-1}(i+N-i_k+i_{FAP}) + w^*(i+i_{max})$$

$$\sum_{k\neq i_{max}}\alpha_k s_{n-1}(i+N-i_k+i_{FAP})]$$

where c is the L-point time-domain channel estimation. Removal of the channel phases may be performed by multiplying, for example, by multiplying the channel gains, thus removing the imaginary component of the correlation coefficient, which is a complex number. By only considering the real component, the noise variance is reduced significantly (e.g., by 50%). The complex portion is representative of the signal noise.

If it is then assumed that $i_{FAP}+P<i_k$, $k\neq i_{FAP}$, the expected value for the correlation coefficient may be given as:

$$E\{r'_{FAP}\} = \|\alpha_{FAP}\|^2\|\alpha_{max}\|^2\sum_{i=0}^{P-1}\|s_n(i)\|^2 \quad (4)$$

Thus, according to equation (4), the expectation is the present example is that the correlation coefficient for the channel activity at the FAP will have a non-zero value, thus indicating that this is more likely that the channel activity in question is correctly a FAP and that the correct location is $i_{FAP}$. Stated alternatively, if the data does not align perfectly, the correlation will have a value of zero, indicating that the FAP is not correctly an FAP, but is more likely to be a LAP.

Similarly, the other part of the two-part test includes correlation of the symbol data corresponding to LAP channel activity with the actual symbol data corresponding with the largest path activity 216. This can be represented quantitatively with a correlation coefficient $r_{LAP}$ that is found with the following equation:

$$r_{LAP} = \sum_{i=0}^{P-1}y(i+i_{LAP})y^*(i+i_{max}) \quad (5)$$

$$= \sum_{i=0}^{P-1}\left[\sum_k \alpha_k s_n(i+i_{LAP}-i_k) + w(i+i_{LAP})\right]\cdot$$

$$\left[\alpha_{max}s_n(i) + \sum_{\{i_k>i_{max}\}}\alpha_k s_{n-1}(i+i_k-i_{max})+\right.$$

$$\left.\sum_{\{i_k<i_{max}\}}\alpha_k s_n(i+i_{max}-i_k) + w(i+i_{max})\right]^*$$

$$= \sum_{i=0}^{P-1}\left[\sum_k \alpha_k s_n(i+i_{LAP}-i_k)\alpha_{max}^*s_n^*(i)+\right.$$

$$\sum_k \alpha_k s_n(i+i_{LAP}-i_k)\sum_{\{i_k>i_{max}\}}\alpha_k^*s_{n-1}^*(i+i_k-i_{max})+$$

-continued $$\sum_k \alpha_k s_n(i+i_{LAP}-i_k) \sum_{\{i_k < i_{max}\}} \alpha_k^* s_n^*(i+i_{max}-i_k) +$$

$$\sum_k \alpha_k s_n(i+i_{LAP}-i_k)w^*(i+i_{max}) + w(i+i_{LAP})\alpha_{max}^* s_n^*(i) +$$

$$w(i+i_{LAP}) \sum_{\{i_k > i_{max}\}} \alpha_k^* s_{n-1}^*(i+i_k-i_{max}) + w(i+i_{LAP})$$

$$\sum_{\{i_k < i_{max}\}} \alpha_k^* s_n^*(i+i_{max}-i_k) + w(i+i_{LAP})w^*(i+i_{max})$$

Multiplying by the channel gains, the following equation (6) is representative of the correlation coefficient.

$$r'_{LAP} = c^*(i_{LAP})c(i_{max})r_{LAP} \qquad (6)$$

$$= (\alpha_{LAP}^* + u^*(i_{LAP}))(\alpha_{max} + u(i_{max}))r_{LAP}$$

$$= (\alpha_{LAP}^* + u^*(i_{LAP}))(\alpha_{max} + u(i_{max})) \sum_{i=0}^{P-1} \left[ \sum_k \alpha_k s_n(i+i_{LAP}-i_k) \right.$$

$$\alpha_{max}^* s_n^*(i) + \sum_k \alpha_k s_n(i+i_{LAP}-i_k)$$

$$\sum_{\{i_k > i_{max}\}} \alpha_k^* s_{n-1}^*(i+i_k-i_{max}) + \sum_k \alpha_k s_n(i+i_{LAP}-i_k)$$

$$\sum_{\{i_k < i_{max}\}} \alpha_k^* s_n^*(i+i_{max}-i_k) + \sum_k \alpha_k s_n(i+i_{LAP}-i_k)w^*(i+i_{max}) +$$

$$w(i+i_{LAP})\alpha_{max}^* s_n^*(i) + w(i+i_{LAP}) \sum_{\{i_k > i_{max}\}} \alpha_k^* s_{n-1}^*(i+i_k-i_{max}) +$$

$$w(i+i_{LAP}) \sum_{\{i_k < i_{max}\}} \alpha_k^* s_n^*(i+i_{max}-i_k) + w(i+i_{LAP})w^*(i+i_{max}) \right]$$

By assuming that $i_{LAP} > i_k + P$, $i_k \neq i_{LAP}$, the expected value of the correlation coefficient is given by:

$$E\{r'_{LAP}\} = 0 \qquad (7)$$

It is noted that the above example is only one of many possible ways to effect the two part test. For example, one skilled in the art will appreciate that the assumptions made for equations (4) and (7) first assume the unwrapped channel activity (FAP) to be correctly located. The methodology may be alternatively implemented by assuming that the LAP is correctly located.

As discussed previously in connection with FIG. 2, an example of the two-part correlation test utilizes a multiple P point or sample segment. As mentioned previously, the P-point OFDM symbol sample segment that corresponds to the late buffer zone of the channel estimates (e.g., 228), is correlated with the P-point OFDM symbol sample segment at position $i_{max}$ in the channel activity zone of the channel estimate with the highest channel energy (e.g., 226). As also mentioned above, the correlation is repeated at K number of neighboring positions. Accordingly, in this example, the correlation coefficient $r_{LAP}$ may be determined using the following equations:

$$r_{LAP}(k_1, k_2) = \sum_{i=0}^{P-1} y(i_{LAP} + i + Mk_1)y^*(i_{max} + i + Mk_2), \qquad (8)$$

$$k_1, k_2 = 0, 1, \ldots, K-1$$

and $$r'_{LAP}(k_1, k_2) = c^*(i_{LAP} + Mk_1 \bmod L)c(i_{max} + Mk_2) \qquad (9)$$

$$\sum_{i=0}^{P-1} y(i_{LAP} + i + Mk_1)y^*(i_{max} + i + Mk_2), k_1, k_2 = 0, 1, \ldots, K-1$$

where M is maximization resolution with $M \in (1, 2, \ldots)$ and MK is the maximization range.

Additionally, after channel activities occurring in the late buffer zone are also "uwrapped" into the corresponding position $i_{FAP}$ as a potential FAP, the P-point OFDM symbol sample segment at position $i_{FAP}$ (e.g., 224) is correlated with the P-point OFDM symbol sample segment at position $i_{max}$ in the channel activity zone with the highest channel energy (e.g., 226) and repeated for the K number of neighboring positions. Accordingly, in this example, the correlation coefficient $r_{FAP}$ may be determined using the following equations:

$$r_{FAP}(k_1, k_2) = \sum_{i=0}^{P-1} y(i_{FAP} + i + Mk_1)y^*(i_{max} + i + Mk_2), \qquad (10)$$

$$k_1, k_2 = 0, 1, \ldots, K-1$$

and $$r'_{FAP}(k_1, k_2) = c^*(i_{FAP} + Mk_1 \bmod L)c(i_{max} + Mk_2) \qquad (11)$$

$$\sum_{i=0}^{P-1} y(i_{FAP} + i + Mk_1)y^*(i_{max} + i + Mk_2), k_1, k_2 = 0, 1, \ldots, K-1$$

In this example, thus, the channel activities occurring in the late buffer zone may be considered as LAPs if the following equation holds true:

$$\max_{(k_1, k_2)} R\{r'_{LAP}(k_1, k_2)\} \geq \max_{(k_1, k_2)} R\{r'_{FAP}(k_1, k_2)\}. \qquad (12)$$

This relationship illustrates that the channel activities are most likely LAPs if the maximum of the real set of numbers for the LAP correlation coefficients (having the imaginary component removed; thus the prime symbol) over the range of K correlations is greater than or equal to the real set of numbers for the FAP correlation coefficients (with the imaginary component removed) over the same range of K correlations.

For simplification, equation (12) above can also be restated as:

$$\max_{(k_1, k_2)} \|r_{LAP}(k_1, k_2)\| \geq \max_{(k_1, k_2)} \|r_{FAP}(k_1, k_2)\| \qquad (13)$$

where the mathematical symbol $\|\ \|$ denotes the operation of determining the magnitude of the complex correlation coefficients. If equation (13) is used to simplify the determination of whether channel activity is LAP or FAP, the simplification is at the cost of degraded performance or accuracy in the determination.

It is noted that if either of conditions (12) or (13) above is false, the channel activity in question is then considered as wrapped FAPs, in this example. The conditions of equations (12) and (13) could be conversely stated according to other examples. In either case, however, a determination is made to see which of the positions LAP or FAP more strongly correlate to the data of the highest energy channel.

It can be seen from the above examples that when the disclosed method is used, the dynamic range is effectively extended from ±128 chips to ±256 chips. One of ordinary skill in the art will appreciated that even further extension of the dynamic range could be possible with further modifications. For example, the early and late buffer zones could be set at 256 samples. This option would, of course, reduce the default channel activity zone and would be viable only as long as the default channel activity zone is large enough to confine the majority of the default channel activity.

Figure 3:
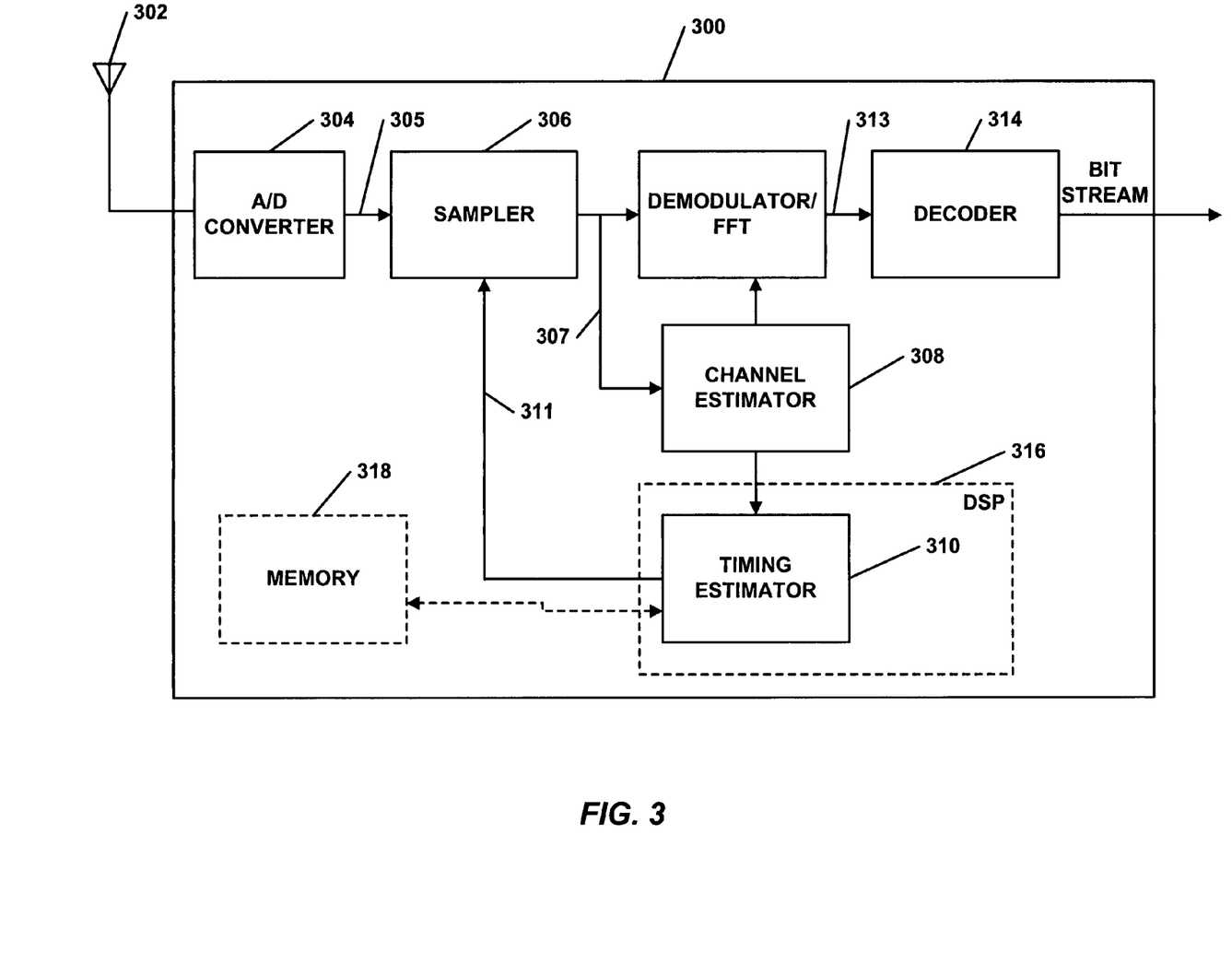
FIG. 3 is a block diagram of a transceiver employing an exemplary apparatus for resolving timing tracking ambiguity according to the present disclosure.

FIG. 3 is a block diagram of an exemplary transceiver 300 that may employ apparatus to effect the above-described methodology for resolving timing ambiguity. As illustrated, the transceiver 300 includes an antenna 302 to receive a transmitted wireless signal. The antenna 302 delivers the signal to an analog-to-digital (A/D) converter 304 that converts the analog wireless signal to a digital signal 305. A/D converter 304 outputs the digital signal 305 to a sampler 306 or similarly suitable device. Regardless, sampler 306 is the portion of the transceiver 300 that effects the actual timing window for sampling the subcarriers or bins within the digital signal 305. The output of the sampler 306, which is a synchronized digital signal 307, is input to both a channel estimator 308 and a demodulator/FFT 312. The channel estimator 308 performs coherent detection, as an example, using the pilot tones inserted by the transmitter (not shown) into the symbol data of the digital signal. Estimator 308 performs the channel estimation that yields an impulse response and frequency response of each channel. These results 309 are transmitted to a timing estimator 310 for calculation of a timing offset or the start of timing for sampling of the channel and to demodulator/FFT 312.

Timing estimation circuit 310, in particular, performs one or more of the methods described previously in connection with FIG. 3 to resolve the timing ambiguity. Thus, timing estimator 310 outputs timing data 311 to the sampler 306 for setting the timing of the sampling window of sampler 306. It is noted that timing estimator 310 may be implemented as hardware, software, or firmware within a transceiver apparatus, such as transceiver 300. Additionally, in the case of a software implementation, the transceiver 300 could include an integrated circuit, such as an Application Specific Integrated Circuit (ASIC) including or interfacing with a computer readable medium having instructions stored thereon (such as a memory 318, for example), the stored instructions, when executed by a processor (e.g., estimator 310), causing the processor to perform the methods described in this disclosure. As another example, the timing estimator 310 could be implemented as a separator processor or could be implemented by a Digital Signal Processor (DSP) 316 within the transceiver 300.

As shown in FIG. 3, the output of the sampler 306 also feeds the signal 307 to a demodulator 312, for demodulating the signal 307, which was modulated by the transmitter (not shown) according to one of a number of known techniques. After demodulation, the resultant demodulated signal 313 is decoded by decoder 314 and output as a serial bit stream for use by a mobile communication device in which the transceiver is housed, such as a mobile phone device or a personal data assistant, as examples.

Figure 4:
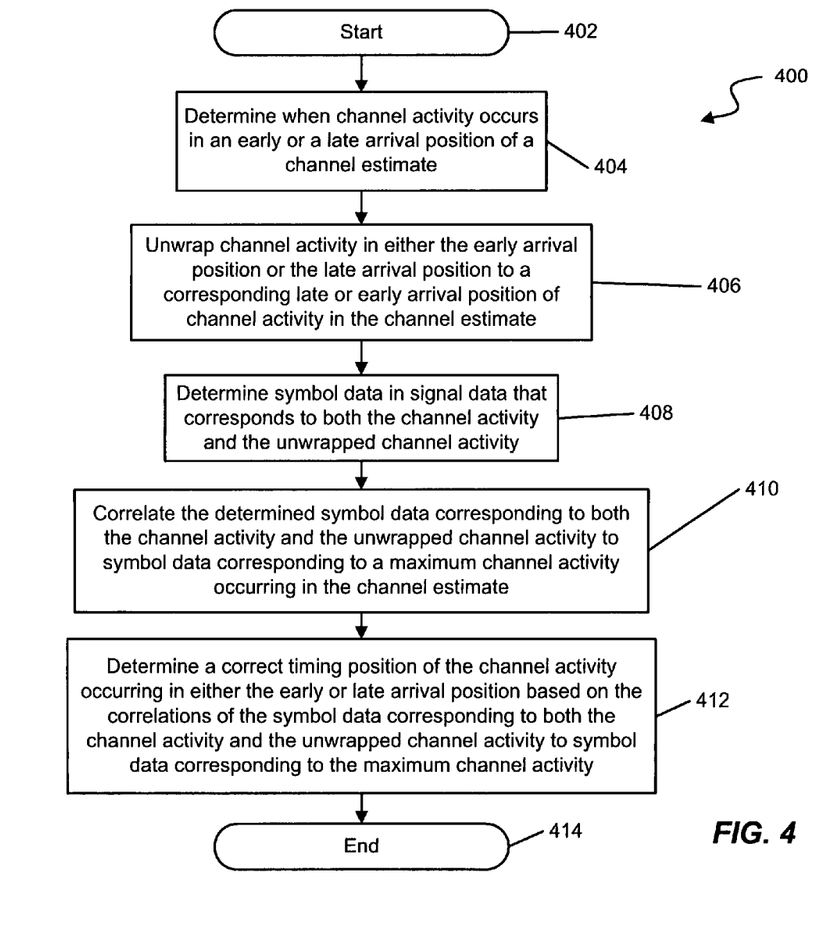
FIG. 4 is a flow diagram of a disclosed exemplary method for determining correspondence between symbols in a channel estimate and actual symbol data and correlating symbol data between corresponding signal symbols in the actual symbol data.

FIG. 4 is a flow diagram of an exemplary method for determining correspondence between symbols in a channel estimate and actual symbol data and correlating symbol data between corresponding signal symbols in the actual symbol data in order to resolve timing ambiguity. As shown, a process 400 is initialized at block 402. Flow proceeds from block 402 to block 404 where a determination is made when channel activity occurs in an early or a late arrival position of a channel estimate. As an example of an implementation of this part of the process, the timing estimator 310 in FIG. 3 examines the channel estimate from channel estimator 308. Alternatively, the channel estimator 308 could also implement this part of the process.

After the determination in block 404 is performed, channel activity is unwrapped for either the early arrival position or the late arrival position to a corresponding late or early arrival position of channel activity in the channel estimate as shown in block 406. This part of the process was discussed above in the example of FIG. 2 where the detected channel activity 206 was unwrapped to the position of unwrapped channel activity 208. The determination of block 406 also includes similarly unwrapping activity occurring in the early buffer zone to a position after the late buffer zone.

After block 406, flow proceeds to block 408 to determine symbol data in signal data that corresponds to both the channel activity and the unwrapped channel activity. The arrows 212 and 214 in FIG. 2 previously illustrated one example of this determination of correspondence performed in block 408. Additionally, the process of block 408 includes the correspondence between the maximum or main channel activity (e.g., 216) and the data 226 in the received data. After the determination of block 408 is completed, flow proceeds to block 410. Here, the two-part test described previous is performed. Specifically, correlation is performed between the determined symbol data corresponding to both the channel activity and the unwrapped channel activity to symbol data corresponding to a maximum channel activity occurring in the channel estimate. Examples of how this correlation is determined were given previously in connection with FIG. 2 and the discussion of equations (1)-(11).

After the correlation of block 410 is complete, flow proceeds to block 412. As shown, block 412 includes determining a correct timing position of the channel activity occurring in either the early or late arrival position based on the correlations of the symbol data corresponding to both the channel activity and the unwrapped channel activity to symbol data corresponding to the maximum channel activity. Stated another way, the timing ambiguity is resolved by according either a FAP or LAP location to the channel activity in question. An exemplary implementation of this determination was discussed previously with respect to equations (12) and (13).

It is noted that the process of FIG. 4 may be implemented by the timing estimator 310 shown in the apparatus of FIG. 3. Alternatively, the method of FIG. 4 could also be implemented by a digital signal processor (e.g., DSP 316 in FIG. 3). Furthermore, the temporal information concerning the determined assignment of either the FAP or LAP location is provided by the timing estimator 310 to either the sampler 306 or the demodulator/FFT 312, as examples.

Figure 5:
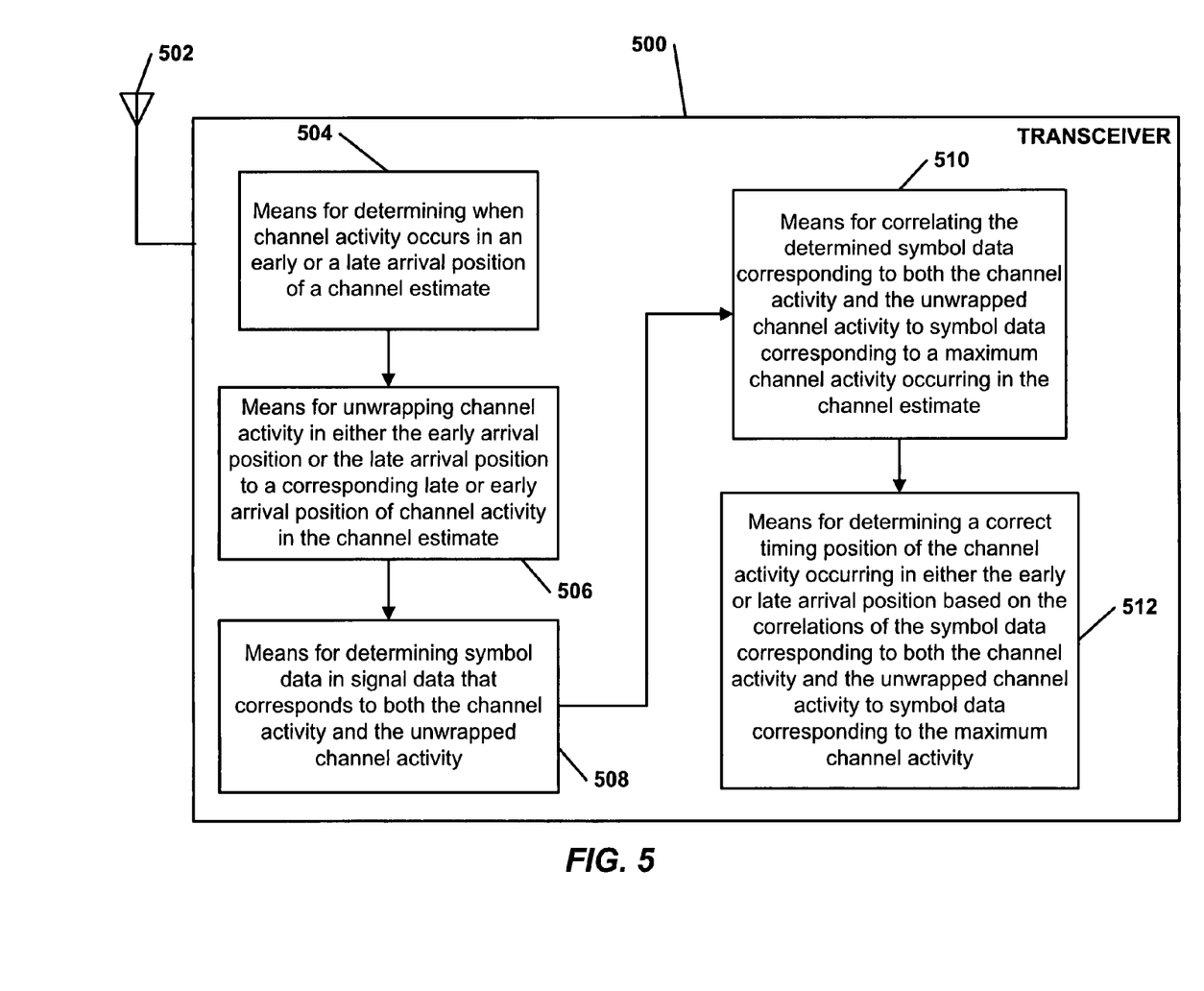
FIG. 5 is a block diagram of another transceiver apparatus for resolving timing tracking ambiguity according to the present disclosure.

FIG. 5 is another example of a transceiver apparatus for resolving timing ambiguity. As illustrated, a wireless transceiver 500 includes connection to an antenna 502 for receiving and transmitting wireless communication signals. Within the device 500 are various means for effecting the method disclosed in FIG. 4, as an example. In particular, the various means are used to effect the resolution of timing ambiguity in a channel estimate.

As shown, the transceiver 500 includes means for determining when channel activity occurs in an early or a late arrival position of a channel estimate 504. This means 504 may be implemented, for example, by the timing estimator 310 or DSP 316 of FIG. 3. Alternatively, means 504 could also be implemented by the channel estimator 308 also shown in FIG. 3. Means 504 outputs the resultant determination to means for unwrapping channel activity in either the early arrival position or the late arrival position to a corresponding late or early arrival position of channel activity in the channel estimate 506. As an example, this means 506 may be implemented for example, by the timing estimator 310 or DSP 316 of FIG. 3. Alternatively, means 506 could also be implemented by the channel estimator 308 also shown in FIG. 3.

Means 506 outputs its resultant determination to means for determining symbol data in signal data that corresponds to both the channel activity and the unwrapped channel activity 508. Means 508, in turn, outputs the resultant correspondence determination to means for correlating the determined symbol data corresponding to both the channel activity and the unwrapped channel activity to symbol data corresponding to a maximum channel activity occurring in the channel estimate 510. Finally, means 510 outputs the correlation results to means for determining a correct timing position of the channel activity occurring in either the early or late arrival position based on the correlations of the symbol data corresponding to both the channel activity and the unwrapped channel activity to symbol data corresponding to the maximum channel activity 512. The determination of the correct timing position resolves timing ambiguity is resolved by according either a FAP or LAP location to the channel activity in question. It is noted that means 506, 5098, 510 and 512 may be implemented for example, by the timing estimator 310 or DSP 316 of FIG. 3 and utilize, as an example, the relationships discussed above in connection with equations (1)-(13) to perform their respective functions.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. A method for resolving a timing ambiguity due to limited dynamic range and periodicity of channel estimation in a communication signal comprising:
   determining when channel activity of the communication signal occurs in at least one of an early or a late arrival position in a communication channel estimate;
   unwrapping the channel activity in either the early arrival position or the late arrival position to a corresponding late or early arrival unwrapped channel activity position in the wireless channel estimate;
   determining symbol data in the communication signal corresponding to both the channel activity and the unwrapped channel activity;
   correlating the determined symbol data corresponding to both the channel activity and the unwrapped channel activity to symbol data corresponding to channel activity occurring in another portion of the channel estimate location outside of the late and early arrival positions including a maximum channel activity; and
   determining whether a timing position of the channel activity occurs in one of the early or late arrival positions based on the correlations of the symbol data corresponding to both the channel activity and the unwrapped channel activity to symbol data corresponding to the maximum channel activity.

2. The method as defined in claim 1, wherein correlating the determined symbol data corresponding to both the channel activity and the unwrapped channel activity to symbol data corresponding channel activity occurring in the another portion of the channel estimate location including the maximum channel activity includes correlating a range of a predetermined number of samples.

3. The method as defined in claim 1, wherein the communication signal is an orthogonal frequency division multiplexed signal.

4. A method for resolving a timing ambiguity due to limited dynamic range and periodicity of channel estimation in a communication signal comprising:
   determining when channel activity of the communication signal occurs in at least one of an early or a late arrival position in a communication channel estimate;
   unwrapping the channel activity in either the early arrival position or the late arrival position to a corresponding late or early arrival unwrapped channel activity position in the wireless channel estimate;
   determining symbol data in the communication signal corresponding to both the channel activity and the unwrapped channel activity;
   correlating the determined symbol data corresponding to both the channel activity and the unwrapped channel activity to symbol data corresponding to channel activity occurring in another portion of the channel estimate location including a maximum channel activity; and
   determining whether a timing position of the channel activity occurs in one of the early or late arrival positions based on the correlations of the symbol data corresponding to both the channel activity and the unwrapped channel activity to symbol data corresponding to the maximum channel activity;
   wherein correlating the determined symbol data corresponding to both the channel activity and the unwrapped channel activity to symbol data corresponding channel activity occurring in the another portion of the channel estimate location including the maximum channel activity includes correlating for a predetermined number of correlations.

5. The method as defined in claim 4, wherein correlating the determined symbol data corresponding to both the channel activity and the unwrapped channel activity to symbol data corresponding channel activity occurring in the another portion of the channel estimate location including the maximum channel activity includes correlating a range of a predetermined number of samples.

6. A method for resolving a timing ambiguity due to limited dynamic range and periodicity of channel estimation for channel activity of a communication signal received in a communication device comprising:
  detecting channel activity in one of a late or early buffer zone of a channel estimate;
  attributing the detected channel activity to one of an early or late channel estimate position that is opposite the location of the detected channel activity;
  determining a corresponding detected data sample in a symbol data sequence that corresponds to the detected channel activity in a location of the symbol data sequence corresponding the detected channel activity location;
  determining a corresponding attributed data sample in the symbol data sequence that corresponds to the attributed channel activity in a location of the symbol data sequence corresponding to the detected channel activity location;
  determining a corresponding maximum channel data sample in the symbol data sequence that corresponds to a maximum channel activity in a location of the symbol data sequence outside of the late and early buffer zones corresponding to the maximum channel activity in the channel estimate;
  performing a first correlation between the corresponding detected data sample and the corresponding maximum channel data sample;
  performing a second correlation between the corresponding attributed data sample and the corresponding maximum channel data sample; and
  determining a correct timing position for the detected channel activity based on a determination of which of the first and second correlations is greater.

7. The method if claim 6, wherein each of the corresponding detected data sample, the corresponding attributed data sample, and the corresponding maximum channel data sample include a predetermined number of data sample points.

8. The method of claim 6, wherein each performance of the first and second correlations includes correlating for a predetermined number of correlations.

9. The method of claim 6, wherein the communication signal is an orthogonal frequency division multiplexed signal.

10. A non-transitory machine-readable storage medium comprising instructions for resolving a timing ambiguity due to limited dynamic range and periodicity of channel estimation comprising:
  instructions for determining when channel activity occurs in at least one of an early or a late arrival position in a communication channel estimate;
  instructions for unwrapping the channel activity in either the early arrival position or the late arrival position to a corresponding late or early arrival unwrapped channel activity position in the wireless channel estimate;
  instructions for determining symbol data in a communication signal corresponding to both the channel activity and the unwrapped channel activity;
  instructions for correlating the determined symbol data corresponding to both the channel activity and the unwrapped channel activity to symbol data corresponding channel activity occurring in another portion of the channel estimate location outside of the late and early arrival positions including a maximum channel activity; and
  instructions for determining whether a timing position of the channel activity occurs in one of the early or late arrival positions based on the correlations of the symbol data corresponding to both the channel activity and the unwrapped channel activity to symbol data corresponding to the maximum channel activity occurring.

11. The machine-readable storage medium as defined in claim 10, wherein the instructions for correlating the determined symbol data corresponding to both the channel activity and the unwrapped channel activity to symbol data corresponding channel activity occurring in another portion of the channel estimate location including the maximum channel activity includes correlating a range of a predetermined number of samples.

12. The machine-readable storage medium as defined in claim 10, wherein the storage medium is configured for use in an orthogonal frequency division multiplexed signal channel estimation.

13. A non-transitory machine-readable storage medium comprising instructions for resolving a timing ambiguity due to limited dynamic range and periodicity of channel estimation comprising:
  instructions for determining when channel activity occurs in at least one of an early or a late arrival position in a communication channel estimate;
  instructions for unwrapping the channel activity in either the early arrival position or the late arrival position to a corresponding late or early arrival unwrapped channel activity position in the wireless channel estimate;
  instructions for determining symbol data in a communication signal corresponding to both the channel activity and the unwrapped channel activity;
  instructions for correlating the determined symbol data corresponding to both the channel activity and the unwrapped channel activity to symbol data corresponding channel activity occurring in another portion of the channel estimate location including a maximum channel activity; and
  instructions for determining whether a timing position of the channel activity occurs in one of the early or late arrival positions based on the correlations of the symbol data corresponding to both the channel activity and the unwrapped channel activity to symbol data corresponding to the maximum channel activity occurring;
  wherein the instructions for correlating the determined symbol data corresponding to both the channel activity and the unwrapped channel activity to symbol data corresponding channel activity occurring in another portion of the channel estimate location including the maximum channel activity includes correlating for a predetermined number of correlations.

14. The machine-readable storage medium as defined in claim 13, wherein the instructions for correlating the determined symbol data corresponding to both the channel activity and the unwrapped channel activity to symbol data corresponding channel activity occurring in another portion of the channel estimate location including the maximum channel activity includes correlating a range of a predetermined number of samples.

15. A non-transitory machine-readable storage medium comprising a set of instructions for resolving a timing ambiguity due to limited dynamic range and periodicity of channel estimation, comprising:
   instructions for detecting channel activity in one of a late or early buffer zone of a channel estimate;
   instructions for attributing the detected channel activity to one of an early or late channel estimate position that is opposite the location of the detected channel activity;
   instructions for determining a corresponding detected data sample in a symbol data sequence that corresponds to the detected channel activity in a location of the symbol data sequence corresponding the detected channel activity location;
   instructions for determining a corresponding attributed data sample in the symbol data sequence that corresponds to the attributed channel activity in a location of the symbol data sequence corresponding the detected channel activity location;
   instructions for determining a corresponding maximum channel data sample in the symbol data sequence that corresponds to a maximum channel activity in a location of the symbol data sequence outside of the late and early buffer zones corresponding the maximum channel activity in the channel estimate;
   instructions for performing a first correlation between the corresponding detected data sample and the corresponding maximum channel data sample;
   instructions for performing a second correlation between the corresponding attributed data sample and the corresponding maximum channel data sample; and
   instructions for determining a correct timing position for the detected channel activity based on a determination of which of the first and second correlations is greater.

16. The machine-readable storage medium as defined in claim 15 wherein each of the corresponding detected data sample, the corresponding attributed data sample, and the corresponding maximum channel data sample include a predetermined number of data sample points.

17. The machine-readable storage medium as defined in claim 15, wherein each performance of the first and second correlations includes correlating for a predetermined number of correlations.

18. The machine-readable storage medium as defined in claim 15 wherein the storage medium is used in an orthogonal frequency division multiplexed system.

19. A transceiver configured for resolving a timing ambiguity due to limited dynamic range and periodicity of channel estimation in a wireless communication system comprising:
   a processor configured to determine when channel activity occurs in at least one of an early or a late arrival position in a communication channel estimate; unwrap the channel activity in either the early arrival position or the late arrival position to a corresponding late or early arrival unwrapped channel activity position in the wireless channel estimate; determine symbol data in a communication signal corresponding to both the channel activity and the unwrapped channel activity; correlate the determined symbol data corresponding to both the channel activity and the unwrapped channel activity to symbol data corresponding channel activity occurring in another portion of the channel estimate location outside of the late and early arrival positions including a maximum channel activity; and determine whether a timing position of the channel activity occurs in one of the early or late arrival positions based on the correlations of the symbol data corresponding to both the channel activity and the unwrapped channel activity to symbol data corresponding to a channel activity, wherein the processor is configured to correlate the determined symbol data corresponding to both the channel activity and the unwrapped channel activity to symbol data corresponding channel activity occurring in another portion of the channel estimate location including the maximum channel activity by correlating over a range of a predetermined number of samples.

20. A transceiver configured for resolving a timing ambiguity due to limited dynamic range and periodicity of channel estimation in a wireless communication system comprising:
   a processor configured to determine when channel activity occurs in at least one of an early or a late arrival position in a communication channel estimate; unwrap the channel activity in either the early arrival position or the late arrival position to a corresponding late or early arrival unwrapped channel activity position in the wireless channel estimate; determine symbol data in a communication signal corresponding to both the channel activity and the unwrapped channel activity; correlate the determined symbol data corresponding to both the channel activity and the unwrapped channel activity to symbol data corresponding channel activity occurring in another portion of the channel estimate location including a maximum channel activity; and determine whether a timing position of the channel activity occurs in one of the early or late arrival positions based on the correlations of the symbol data corresponding to both the channel activity and the unwrapped channel activity to symbol data corresponding to a channel activity;
   wherein the processor is configured to correlate the determined symbol data corresponding to both the channel activity and the unwrapped channel activity to symbol data corresponding channel activity occurring in another portion of the channel estimate location including the maximum channel activity by correlating over a range of a predetermined number of samples; and
   wherein the processor is configured to correlate the determined symbol data corresponding to both the channel activity and the unwrapped channel activity to symbol data corresponding channel activity occurring in another portion of the channel estimate location including the maximum channel activity by correlating for a predetermined number of correlations.

21. The transceiver as defined in claim 20, wherein the wireless communication system is an orthogonal frequency division multiplexed system.

22. A transceiver configured for resolving a timing ambiguity due to limited dynamic range and periodicity of channel estimation in a wireless communication system comprising:
   a processor configured to detect channel activity in one of a late or early buffer zone of a channel estimate; attribute the detected channel activity to one of an early or late channel estimate position that is opposite the location of the detected channel activity; determine a corresponding detected data sample in a symbol data sequence that corresponds to the detected channel activity in a location of the symbol data sequence corresponding the detected channel activity location; determine a corresponding attributed data sample in the symbol data sequence that corresponds to the attributed channel activity in a location of the symbol data sequence corresponding to the detected channel activity location; determine a corresponding maximum channel data sample in the symbol data sequence that corresponds to a maximum channel activity in a location of the symbol data sequence outside of the late and early buffer zones corresponding to the maximum channel activity in the channel estimate; perform a first correlation between the corresponding detected data sample and the corresponding maximum channel data sample; perform a second correlation between the corresponding attributed data sample and the corresponding maximum channel data sample; and determine a correct timing position for the detected channel activity based on a determination of which of the first and second correlations is greater.

23. The transceiver as defined in claim 22, wherein each of the corresponding detected data sample, the corresponding attributed data sample, and the corresponding maximum channel data sample include a predetermined number of data sample points.

24. The transceiver as defined in claim 22, wherein the processor is configured to perform each performance of the first and second correlations by including correlating for a predetermined number of correlations.

25. The transceiver as defined in claim 22, wherein the wireless communication system is an orthogonal frequency division multiplexed system.

26. An apparatus for resolving timing ambiguity due to limited dynamic range and periodicity of channel estimation in a wireless communication device comprising:
means for determining when channel activity occurs in an early or a late arrival position of a channel estimate;
means for unwrapping channel activity in either the early arrival position or the late arrival position to a corresponding late or early arrival position of channel activity in the channel estimate;
means for determining symbol data in signal data that corresponds to both the channel activity and the unwrapped channel activity;
means for correlating the determined symbol data corresponding to both the channel activity and the unwrapped channel activity to symbol data corresponding to a maximum channel activity occurring in the channel estimate outside of the late and early arrival positions; and
means for determining a correct timing position of the channel activity occurring in either the early or late arrival position based on the correlations of the symbol data corresponding to both the channel activity and the unwrapped channel activity to symbol data corresponding to the maximum channel activity, wherein the means for correlating further includes means for correlating the determined symbol data corresponding to both the channel activity and the unwrapped channel activity to symbol data corresponding channel activity occurring in another portion of the channel estimate location including the maximum channel activity includes correlating a range of a predetermined number of samples.

27. The apparatus as defined in claim 26, wherein the wireless communication device is orthogonal frequency division multiplexed.

28. An apparatus for resolving timing ambiguity due to limited dynamic range and periodicity of channel estimation in a wireless communication device comprising:
means for determining when channel activity occurs in an early or a late arrival position of a channel estimate;
means for unwrapping channel activity in either the early arrival position or the late arrival position to a corresponding late or early arrival position of channel activity in the channel estimate;
means for determining symbol data in signal data that corresponds to both the channel activity and the unwrapped channel activity;
means for correlating the determined symbol data corresponding to both the channel activity and the unwrapped channel activity to symbol data corresponding to a maximum channel activity occurring in the channel estimate; and
means for determining a correct timing position of the channel activity occurring in either the early or late arrival position based on the correlations of the symbol data corresponding to both the channel activity and the unwrapped channel activity to symbol data corresponding to the maximum channel activity;
wherein the means for correlating further includes means for correlating the determined symbol data corresponding to both the channel activity and the unwrapped channel activity to symbol data corresponding channel activity occurring in another portion of the channel estimate location including the maximum channel activity includes correlating for a predetermined number of correlations.

29. The apparatus as defined in claim 28, wherein the means for correlating further includes means for correlating the determined symbol data corresponding to both the channel activity and the unwrapped channel activity to symbol data corresponding channel activity occurring in another portion of the channel estimate location including the maximum channel activity includes correlating a range of a predetermined number of samples.

30. A method for resolving a timing ambiguity due to limited dynamic range and periodicity of channel estimation in a communication channel estimation comprising:
detecting when channel activity in a communication channel occurs in at least one of an early or a late arrival position in a communication channel estimate;
unwrapping the detected channel activity in either the early arrival position or the late arrival position to a corresponding late or early arrival unwrapped channel activity position in a wireless channel estimate;
correlating symbol data in a communication signal corresponding to both the channel activity and the unwrapped channel activity positions to symbol data corresponding to a main channel activity; and
determining whether a correct timing position of the channel activity is one of the early or late arrival positions based on the correlations, wherein correlating symbol data includes correlating over a range of a predetermined number of samples.

31. The method of claim 30, wherein the communication channel is an orthogonal frequency division multiplexed signal.

32. A method for resolving a timing ambiguity due to limited dynamic range and periodicity of channel estimation in a communication channel estimation comprising:
detecting when channel activity in a communication channel occurs in at least one of an early or a late arrival position in a communication channel estimate;
unwrapping the detected channel activity in either the early arrival position or the late arrival position to a corresponding late or early arrival unwrapped channel activity position in a wireless channel estimate;
correlating symbol data in a communication signal corresponding to both the channel activity and the unwrapped channel activity positions to symbol data corresponding to a main channel activity; and determining whether a correct timing position of the channel activity is one of the early or late arrival positions based on the correlations, wherein correlating includes correlating for a predetermined number of correlations.

33. A wireless transceiver comprising:
a timing estimation circuit configured to detect when channel activity in a communication channel occurs in at least one of an early or a late arrival position in a communication channel estimate; to unwrap the detected channel activity in either the early arrival position or the late arrival position to a corresponding late or early arrival unwrapped channel activity position in the wireless channel estimate; to correlate symbol data in a communication signal corresponding to both the channel activity and the unwrapped channel activity positions to symbol data corresponding to a main channel activity; and to determine whether a correct timing position of the channel activity is one of the early or late arrival positions based on the correlations, wherein the timing estimation circuit is further configured to correlate symbol data by including correlation over a range of a predetermined number of samples.

34. The transceiver as defined in claim 33, wherein the transceiver is configured to operate in an orthogonal frequency division multiplexed system.

35. A wireless transceiver comprising:
a timing estimation circuit configured to detect when channel activity in a communication channel occurs in at least one of an early or a late arrival position in a communication channel estimate; to unwrap the detected channel activity in either the early arrival position or the late arrival position to a corresponding late or early arrival unwrapped channel activity position in the wireless channel estimate; to correlate symbol data in a communication signal corresponding to both the channel activity and the unwrapped channel activity positions to symbol data corresponding to a main channel activity; and to determine whether a correct timing position of the channel activity is one of the early or late arrival positions based on the correlations, wherein the timing estimation circuit is further configured to correlate symbol data by including correlation for a predetermined number of correlations.

36. A method for resolving a timing ambiguity due to limited dynamic range and periodicity of channel estimation in a communication signal comprising:
determining a first channel activity of the communication signal occurring in an early arrival position in a communication channel estimate;
unwrapping the first channel activity in a late arrival position in the communication channel estimate;
determining symbol data in the communication signal corresponding to both the first channel activity and the unwrapped first channel activity;
correlating the determined symbol data corresponding to both the first channel activity and the unwrapped first channel activity to symbol data corresponding to a second channel activity occurring in another portion of the channel estimate including a main channel activity; and
determining a timing position of the first channel activity based on the correlation of the determined symbol data corresponding to both the first channel activity and the unwrapped first channel activity to symbol data corresponding to the second channel activity, wherein the timing position of the first channel activity is determined to be in the early arrival position when the correlation of the determined symbol data corresponding to the first channel activity to the symbol data corresponding to the second channel activity is greater than the correlation of the determined symbol data corresponding to the unwrapped first channel activity to the symbol data corresponding to the second channel activity.

37. The method of claim 36, wherein the communication signal is an orthogonal frequency division multiplexed signal.

38. A method for resolving a timing ambiguity due to limited dynamic range and periodicity of channel estimation in a communication signal comprising:
determining a first channel activity of the communication signal occurring in an early arrival position in a communication channel estimate;
unwrapping the first channel activity in a late arrival position in the communication channel estimate;
determining symbol data in the communication signal corresponding to both the first channel activity and the unwrapped first channel activity;
correlating the determined symbol data corresponding to both the first channel activity and the unwrapped first channel activity to symbol data corresponding to a second channel activity occurring in another portion of the channel estimate including a main channel activity; and
determining a timing position of the first channel activity based on the correlation of the determined symbol data corresponding to both the first channel activity and the unwrapped first channel activity to symbol data corresponding to the second channel activity;
wherein the timing position of the first channel activity is determined to be in the late arrival position when the correlation of the determined symbol data corresponding to the first channel activity to the symbol data corresponding to the second channel activity is less than the correlation of the determined symbol data corresponding to the unwrapped first channel activity to the symbol data corresponding to the second channel activity.

39. The method of claim 38, wherein correlating the determined symbol data includes correlating over a range of a predetermined number of samples or includes correlating for a predetermined number of intervals.

40. A method for resolving a timing ambiguity due to limited dynamic range and periodicity of channel estimation in a communication signal comprising:
determining a first channel activity of the communication signal occurring in a late arrival position in a communication channel estimate;
unwrapping the first channel activity in an early arrival position in the communication channel estimate;
determining symbol data in the communication signal corresponding to both the first channel activity and the unwrapped first channel activity;
correlating the determined symbol data corresponding to both the first channel activity and the unwrapped first channel activity to symbol data corresponding to a second channel activity occurring in another portion of the channel estimate including a main channel activity; and
determining a timing position of the first channel activity based on the correlation of the determined symbol data corresponding to both the first channel activity and the unwrapped first channel activity to symbol data corresponding to the second channel activity, wherein the timing position of the first channel activity is determined to be in the late arrival position when the correlation of the determined symbol data corresponding to the first channel activity to the symbol data corresponding to the second channel activity is greater than the correlation of the determined symbol data corresponding to the unwrapped first channel activity to the symbol data corresponding to the second channel activity.

41. The method of claim 40, wherein the communication signal is an orthogonal frequency division multiplexed signal.

42. A method for resolving a timing ambiguity due to limited dynamic range and periodicity of channel estimation in a communication signal comprising:
determining a first channel activity of the communication signal occurring in a late arrival position in a communication channel estimate;
unwrapping the first channel activity in an early arrival position in the communication channel estimate;
determining symbol data in the communication signal corresponding to both the first channel activity and the unwrapped first channel activity;
correlating the determined symbol data corresponding to both the first channel activity and the unwrapped first channel activity to symbol data corresponding to a second channel activity occurring in another portion of the channel estimate including a main channel activity; and
determining a timing position of the first channel activity based on the correlation of the determined symbol data corresponding to both the first channel activity and the unwrapped first channel activity to symbol data corresponding to the second channel activity;
wherein the timing position of the first channel activity is determined to be in the early arrival position when the correlation of the determined symbol data corresponding to the first channel activity to the symbol data corresponding to the second channel activity is less than the correlation of the determined symbol data corresponding to the unwrapped first channel activity to the symbol data corresponding to the second channel activity.

43. A method for resolving a timing ambiguity due to limited dynamic range and periodicity of channel estimation in a communication channel estimation comprising:
detecting first channel activity occurring in an early arrival position in a communication channel estimate;
unwrapping the detected first channel activity in a late arrival position in a wireless channel estimate;
correlating symbol data in a communication signal corresponding to both the first channel activity and the unwrapped first channel activity positions to symbol data corresponding to a main channel activity; and
determining a timing position of the first channel activity based on the correlations, wherein the timing position of the first channel activity is determined to be in the early arrival position when the correlation of the symbol data of the first channel activity position to the symbol data corresponding to the main channel activity is greater than the correlation of the symbol data of the first unwrapped channel activity position to the symbol data corresponding to the main channel activity.

44. The method of claim 43, wherein a communication channel is orthogonal frequency division multiplexed.

45. A method for resolving a timing ambiguity due to limited dynamic range and periodicity of channel estimation in a communication channel estimation comprising:
detecting first channel activity occurring in an early arrival position in a communication channel estimate;
unwrapping the detected first channel activity in a late arrival position in the wireless channel estimate;
correlating symbol data in a communication signal corresponding to both the first channel activity and the unwrapped first channel activity positions to symbol data corresponding to a main channel activity; and
determining a timing position of the first channel activity based on the correlations, wherein the timing position of the first channel activity is determined to be in the late arrival position when the correlation of the symbol data of the first channel activity position to the symbol data corresponding to the main channel activity is less than the correlation of the symbol data of the first unwrapped channel activity position to the symbol data corresponding to the main channel activity.

46. A method for resolving a timing ambiguity due to limited dynamic range and periodicity of channel estimation in a communication channel estimation comprising:
detecting first channel activity occurring in a late arrival position in a communication channel estimate;
unwrapping the detected first channel activity in an early arrival position in the wireless channel estimate;
correlating symbol data in a communication signal corresponding to both the first channel activity and the unwrapped first channel activity positions to symbol data corresponding to a main channel activity; and
determining a timing position of the first channel activity based on the correlations, wherein the timing position of the first channel activity is determined to be in the late arrival position when the correlation of the symbol data of the first channel activity position to the symbol data corresponding to the main channel activity is greater than the correlation of the symbol data of the first unwrapped channel activity position to the symbol data corresponding to the main channel activity.

47. The method of claim 46, wherein a communication channel is orthogonal frequency division multiplexed.

48. A method for resolving a timing ambiguity due to limited dynamic range and periodicity of channel estimation in a communication channel estimation comprising:
detecting first channel activity occurring in a late arrival position in a communication channel estimate;
unwrapping the detected first channel activity in an early arrival position in a wireless channel estimate;
correlating symbol data in a communication signal corresponding to both the first channel activity and the unwrapped first channel activity positions to symbol data corresponding to a main channel activity; and
determining a timing position of the first channel activity based on the correlations, wherein the timing position of the first channel activity is determined to be in the early arrival position when the correlation of the symbol data of the first channel activity position to the symbol data corresponding to the main channel activity is less than the correlation of the symbol data of the first unwrapped channel activity position to the symbol data corresponding to the main channel activity.

49. A method for resolving a timing ambiguity due to limited dynamic range and periodicity of channel estimation in a communication channel estimation comprising:
detecting first channel activity occurring in a late arrival position in a communication channel estimate;
unwrapping the detected first channel activity in an early arrival position in the wireless channel estimate;
correlating symbol data in a communication signal corresponding to both the first channel activity and the unwrapped first channel activity positions to symbol data corresponding to a main channel activity; and
determining a timing position of the first channel activity based on the correlations, wherein correlating the determined symbol data includes correlating over a range of a predetermined number of samples or includes correlating for a predetermined number of intervals.

* * * * *